(12) United States Patent
Palys et al.

(10) Patent No.: US 6,555,019 B2
(45) Date of Patent: Apr. 29, 2003

(54) SULFUR FREE, LOW COLOR GENERATING SCORCH TIME EXTENDING COMPOSITIONS FOR USE IN COMPOUNDING AND CURE OF FREE RADICAL INITIATOR CURABLE POLYMERS

(75) Inventors: Leonard Henry Palys, Upper Uwchlan, PA (US); Michael Fred Novits, Buffalo, NY (US); Leo Kasehagen, Malvern, PA (US); Fabien Debaud, Lyons (FR); Luciano Abrigo, Alessandria (IT)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/022,661

(22) Filed: Dec. 17, 2001

(65) Prior Publication Data

US 2002/0177671 A1 Nov. 28, 2002

Related U.S. Application Data

(60) Provisional application No. 60/277,728, filed on Mar. 22, 2001.

(51) Int. Cl.⁷ .............................. C08J 3/24; C08C 19/00; C08F 8/00; C09K 8/30

(52) U.S. Cl. .............................. 252/182.18; 252/182.2; 252/182.29; 252/182.31; 252/183.12

(58) Field of Search ........................ 252/182.18, 182.2, 252/182.29, 182.31, 183.12

(56) References Cited

U.S. PATENT DOCUMENTS

| | | | | |
|---|---|---|---|---|
| 5,245,084 | A | | 9/1993 | Groepper et al. ............ 568/558 |
| 5,272,213 | A | * | 12/1993 | Knowles et al. ............. 525/305 |
| 5,849,214 | A | * | 12/1998 | Novits et al. .......... 252/182.17 |
| 5,876,624 | A | * | 3/1999 | Novits et al. .......... 252/182.17 |
| 5,994,473 | A | * | 11/1999 | Sempio et al. ............... 525/257 |
| 6,069,208 | A | * | 5/2000 | Novits et al. ............. 525/331.1 |
| 6,180,706 | B1 | * | 1/2001 | Keogh ......................... 524/347 |
| 6,197,213 | B1 | | 3/2001 | Novits et al. ................ 252/182 |

FOREIGN PATENT DOCUMENTS

| | | | |
|---|---|---|---|
| EP | 812878 | 12/1997 | ............ C08K/5/00 |
| EP | 1041581 | 10/2000 | ............ H01B/3/44 |

\* cited by examiner

*Primary Examiner*—Joseph D. Anthony
(74) *Attorney, Agent, or Firm*—William D. Mitchell

(57) ABSTRACT

Sulfur free, crosslinking, scorch-retarding compositions for compounding and cure of polymers susceptible to cure by free radical initiators are disclosed.

5 Claims, No Drawings

SULFUR FREE, LOW COLOR GENERATING SCORCH TIME EXTENDING COMPOSITIONS FOR USE IN COMPOUNDING AND CURE OF FREE RADICAL INITIATOR CURABLE POLYMERS

This application claims priority from provisional application No. 60/277,728 filed Mar. 22, 2001.

BACKGROUND OF THE INVENTION

This invention relates to compositions of matter known in the art of chemistry as inhibitors or retarders of scorch or premature onset of cure (crosslinking) during the compounding and subsequent processing in the presence of free radical initiators of thermoplastic polymers, elastomeric polymers or mixtures of said polymers which are capable of cure by such free radical initiators, mixtures of such inhibitors of scorch with the free radical initiators, to processes for their manufacture and use as well as to polymeric compositions containing such inhibitors of scorch and to curable compositions comprising such inhibitors of scorch, free radical initiators and at least one polymeric material capable of cure by a free radical initiator.

Free radical initiators (Organic peroxides and, optionally, certain azo initiators) are used in crosslinking thermoplastic polymers and elastomers and their mixtures when the final products are required to meet high mechanical and physical requirements, such as improved thermal aging and lower residual (permanent) deformation under pressure compared with uncrosslinked thermoplastics and/or sulfur cured elastomers.

Since both thermoplastics and elastomers are solid materials at normal room temperatures, in order to add the free radical crosslinking agent and any other desired ingredients such as dyes, pigments, fillers, antioxidants, UV and heat stabilizers and the like into the polymer, the polymers must be mechanically mixed with the free radical crosslinking agent and any of the other desired ingredients at temperatures sufficiently elevated to allow the polymers to flow in the mixing equipment.

The crosslinking period and the time from the addition of the free radical initiator up to incipient cross linkage (scorch time) are dependent on the thermal decomposition rate (conveniently expressed as the half-life period) of the free radical initiators employed as crosslinking agents.

Obviously, the longer the processing time before onset of scorch that can be provided to a manufacturer without sacrifice of final crosslink speed or density, the more beneficial it will be because with conventional methods of mixing or compounding, such as milling, Banbury, or extrusion scorch begins when the time and temperature relationship results in the initiation of decomposition of the free radical initiator. If this occurs too soon, gel particles in the mass of polymer to be compounded may be formed thereby producing inhomogeneity in the final product. Excessive scorch reduces the plastic properties of the material so that it can no longer be processed, thus, resulting in loss of the entire batch.

These have been a number of approaches attempted to extend scorch time and these are discussed in what applicants consider to be the two most pertinent prior art references cited below. Other pertinent art is discussed in those references, but such art is really only of background interest for this invention.

DISCLOSURE OF PRIOR ART

Groepper, et al., in U.S. Pat. No. 5,245,084 discloses the use of organic peroxides suitable for crosslinking thermoplastics and elastomers in combination with a specific group of hydroquinones and a crosslinkage promoter selected from the usual crosslinkage promoters normally used in these applications. One specific purpose of his invention is the avoidance of the presence of sulfur releasing compounds in the polymers to be processed while extending the scorch time without adversely affecting cure time or cure density. The use of hydroquinone mono alkyl or aryl ethers is neither taught nor suggested.

Novits et al., in U.S. Pat. No. 6,197,231B1 teaches an improvement over Groepper. The use of a combination of free radical initiators (either organic peroxides or a specific class of azo initiators) in combination with hydroquinones, crosslinkage promoters and known sulfur releasing sulfur accelerators for sulfur cure of elastomers is taught for extending scorch time without adverse effects on cure time or cure density for thermoplastics, elastomers and their mixtures is taught. Hydroquinone mono alkyl and aryl ethers are included in the hydroquinones listed as suitable for use, but their use without the sulfur accelerators is not suggested nor is the advantage found by applicants for such use suggested by either reference. For wire and cable insulation and some other uses, the presence of sulfur is not desired because it may affect insulation value and/or discolor metals it is in contact with.

SUMMARY OF THE INVENTION

The invention provides in a composition aspect, a mixture for crosslinking thermoplastic, elastomeric and mixtures of thermoplastic and elastomeric polymers capable of being crosslinked by free radical initiators providing extended scorch time during compounding, without adverse effect on final crosslink time or crosslink density consisting essentially of a) at least one free radical initiator suitable for crosslinking such polymers selected from the group consisting of organic peroxides and azo initiators;

b) at least one hydroquinone mono alkyl or aryl ether;

c) at least one allylic crosslinkage promoter.

The composition aspects of the invention possess the inherent applied use characteristic of being scorch retarders when employed during compounding of thermoplastic, elastomeric and mixtures of thermoplastic and elastomeric polymers capable of cure by free radical initiators while having no adverse effect on the cure time or cure density of such polymers and also have minimal adverse effects on the color of such polymers after cure.

Special mention is made of aspects of the invention wherein the hydroquinone mono alkyl ether is hydroquinone monomethyl ether, which composition has been shown to have the least adverse effect on color.

The invention also contemplates a mixture prepared by mixing the three ingredients of the composition together as the essential ingredients in any order either prior to or during addition to the polymers.

By "consisting essentially of" is meant that the mixture modified by the expression does not contain scorch retarder ingredients previously employed as such, except for those ingredients specifically named, but the presence of other conventional polymer additives such as antioxidants, heat and light stabilizers, plasticizers and the like are not excluded. Provided the hydroquinone mono alkyl or mono aryl ether is present the presence of a second hydroquinone of the type described in the Groepper patent is permitted.

By "thermoplastic, elastomeric and mixtures of thermoplastic and elastomeric polymers curable or crosslinkable with free radical initiators" is meant all those solid polymers which meet that description but excluding such polymers as polypropylene and mixtures of solid polymers containing 20% or more polypropylene which are known not to be susceptible to cure or crosslinking with free radical initiators selected from organic peroxides and azo initiators.

DETAILED DESCRIPTION

The starting materials for the manufacture of the compositions contemplated by the invention are all well known compounds and are either commercially available or may be prepared by synthetic techniques well known in the art.

The superior scorch resistance with no adverse effect on cure time, crosslink density or color for free radical initiator curable thermoplastic and/or elastomeric polymers may be obtained by admixing, conveniently by employing conventional compounding means, with such polymer(s) wherein crosslinking is desired, a scorch retarding/crosslinking composition of the composition aspect of the invention.

The scorch retarding/crosslinking composition may preferably be blended into the desired polymers as a preformed mixture or the individual ingredients may be added individually or as subcombinations of one or more of the ingredients. It is preferred that in the latter two cases the hydroquinone or the hydroquinone and the crosslinkage promoter be added to the polymer before the addition of the free radical initiator.

Free Radical Initiators

In accordance with the present invention, compounds well known in the art as azo initiators and/or organic peroxides (with the exception of hydroperoxides and peroxydicarbonates) which upon thermal decomposition generate free radicals that facilitate the curing/crosslinking reaction may be employed.

Detailed listings of such initiators are provided in U.S. Pat. Nos. 5,245,084 and 6,197,213B1 and the references cited therein as are detailed conditions of use and proportional amounts by weight to employ in the curing of the polymers.

Suitable polymers and copolymers are also listed in the same two patents and the references cited therein.

The allylic monomer crosslinking agents such as triallyl cyanurate, triallyl phosphate, allyldiglycol and the like cited in the same two patents are those contemplated for use in the invention in the proportion by weight quantities given in those two patents.

The hydroquinone mono alkyl and mono aryl ethers are all well known compounds and may be used in the proportions by weight given in U.S. Pat. No. 6,197,213B1.

Typical examples are:

hydroquinone monomethyl ether, hydroquinone monobenzyl ether, hydroquinone mono phenyl ether, hydroquinone monoethyl ether and, hydroquinone monopropyl ether.

The alkyl and aryl groups are not contemplated as exceeding 10 carbon atoms. Hydroquinone monomethyl ether is preferred.

The crosslinking/scorch retarding compositions of this invention are homogeneous meltable solids if the peroxide is a solid at ambient temperature, or a liquid if the peroxide is a liquid at ambient temperature. Solid compositions may be ground by standard methods into free flowing powders for convenience in addition to polymer compositions, or, if desired, polymeric master batches may be prepared by melt blending the scorch retarding/crosslinking compositions as concentrates into carrier polymers compatible with or identical in composition to the polymer which is to be compounded and cured. The master batches may also be prepared on inert fillers as carriers.

The following Examples further illustrate the best mode contemplated by the inventors for the practice of their invention.

Peroxide compositions were prepared and then absorbed onto cable grade polyethylene in glass jars. The jars were place in a 70° C. hot air oven to accelerate absorption. These prepared samples were used for color and crosslinking evaluation work. Crosslinking evaluation work was conducted using a Moving Die Rheometer (Alpha Technologies MDR 2000E) which was interfaced to an IBM type personal computer for raw data collection and computation. Temperatures and degrees of arc employed are provided in the data tables. The rheometer creates a very uniform, consistent flat crosslinked disk which was subsequently used to measure final cured polyethylene color.

Color measurements were conducted using a HunterLab ColorQUEST Sphere Spectrocolorimeter. The Spectrocolorimeter was standardized using Reflectance-Specular Included (RSIN) using the SAV (small angle view lens) and UV included, together with specially supplied black, white and gray standard color plaques provided by the manufacturer. Color measurements were made using the centermost portion of the MDR cured specimen as this represents an exact thickness dimension, relating to a present die gap on the instrument which is calibrated by Alpha Technologies Engineers on a regular basis as part of the instrument certification maintenance program. Color data reported in the data tables are b* and YID. The b* is a measurement of the yellowness for positive values or blueness for negative b* values, of a measured specimen. When the b* is in the positive range (as in the case of our data) this is the chromaticity color intensity. Furthermore YID data was also measured with this instrument. YID or yellowness index is a color measurement associated with changes in polymer degradation. The higher the YID value, the more yellow color intensity exists for that product, conversely lower YID numbers mean that the sample exhibits lower yellow color.

In our peroxide composition examples we provide mixtures of other hydroquinones used in combination with an ether type hydroquinone as taught in the practice of our invention. This was done because of the poor solubility of the other hydroquinones in the peroxide, in conjunction with their inherent inefficiency to provide increase scorch time protection, compared to the singular use of hydroquinone monomethyl ether. We found that unexpectedly the other hydroquinone compounds will precipitate or separate from the peroxide upon standing, which would then provide inconsistent and harmful effects upon the crosslinking and electrical properties of a high voltage cable insulation. In summary our color and crosslinking performance data shows that the use of dicumyl peroxide, hydroquinone monomethyl ether and TAC provides equal weight crosslinking performance to a cable grade dicumyl peroxide, while providing the best overall scorch time performance with a final color, superior to even the use of the cable grade dicumyl peroxide alone. The totality of these unexpected advantages, makes this peroxide composition particularly useful for wire and cable applications.

Peroxide, Ether Quinone and Coagent Composition Ratios

The ether quinone to allylic coagent maximum ranges are: 100:1 to 1:100. The peroxide to (ether quinone & allylic coagent) blend maximum ranges are: 1:50 to 50:1. The ether quinone to allylic coagent preferred ranges are: 5:1 to 1:5, preferably 1:1 to 1:5. The peroxide to (ether quinone and allylic coagent) blend preferred ranges are: 1:3 to 10:1; most preferably 3:1 to 7:1 (all by weight).

EXAMPLE 1

Effect of Various Peroxide Compositions on the Color (Yellowness) of the Crosslinked Ultrapure Polyethylene Cable Insulation In Table 1 we evaluated dicumyl peroxide alone and blended with various prior art hydroquinones and TAC, together with hydroquinone monomethyl ether and TAC. The control peroxide (standard dicumyl peroxide with no additives) is provided as composition #1. Blends of various hydroquinones (compositions #2 and #3) were compared to the singular use of hydroquinone monomethyl ether, due to the poor solubility of mono-t-butyl hydroquinone and di-t-amyl hydroquinone in the dicumyl peroxide. The composition taught by the present invention using a peroxide, an ether type hydroquinone and an allylic coagent is provided as composition #4.

The levels of peroxide composition used to crosslink the ultrapure polyethylene cable insulation were adjusted to provide similar degrees of crosslinking or $M_H$–$M_L$ (inch pounds). Quite unexpectedly, we discovered that the polyethylene cured with a blend of dicumyl peroxide, TAC and hydroquinone monomethyl ether (composition #4) was much better in color than when other quinones were incorporated in similar compositions (#2 and #3).

Most surprisingly is the highly significant improvement in color when using the peroxide formulation taught by the present invention (composition #4), compared to the use of pure cable grade dicumyl peroxide (peroxide composition #1). This is extremely essential to the wire and cable industry, as color generation constitutes formation of potentially undesirable species which compromises the electrical performance of ultrapure polyethylene cable insulation. Impurities in ultrapure polyethylene serve as sites for "tree formation" or pathways for electrical surges through the primary insulation leading to ultimate catastrophic insulation breakdown. Thus the most essential feature of our invention is the dramatic improvement in the quality of the final crosslinked ultrapure polyethylene.

Having achieved an impurity free crosslinked product one must also consider the cable manufacturing step. This is discussed in Example 2.

TABLE 1

| Peroxide Composition # | 1 | 2 | 3 | 4 |
|---|---|---|---|---|
| Effect of Various Peroxide Compositions on the Color (Yellowness) of the Crosslinked Ultrapure Polyethylene Cable Insulation ||||| 
| Cable grade dicumyl peroxide (%) | 100.0 | 89.0 | 89.0 | 89.0 |
| Triallyl cyanurate (%) | — | 7.5 | 7.5 | 8.3 |
| Hydroquinone monomethyl ether (%) | — | 2.0 | 2.0 | 2.7 |
| Mono-t-butyl hydroquinone (%) | — | 1.5 | — | — |
| di-t-amyl hydroquinone (%) | — | — | 1.5 | — |
| Crosslinking an ultrapure polyethylene cable insulation with the various peroxide compositions provided above, using an MDR 2000E (Moving Die Rheometer) at 175° C. at 1°arc ||||| 
| Cable grade polyethylene (grams) | 100.00 | 100.00 | 100.00 | 100.00 |
| Peroxide composition #1 (grams) | 1.79 | — | — | — |
| Peroxide composition #2 (grams) | — | 1.82 | — | — |
| Peroxide composition #3 (grams) | — | — | 1.84 | — |
| Peroxide composition #4 (grams) | — | — | — | 1.79 |

TABLE 1-continued

| Peroxide Composition # | 1 | 2 | 3 | 4 |
|---|---|---|---|---|
| Color Measurements on Crosslinked Polyethylene MDR Samples using a Hunter ColorQUEST Sphere Spectrocolorimeter ||||| 
| b* (yellow when "+", blue when "–" | 1.94 | 2.08 | 2.05 | 1.76 |
| YID (yellowness index YI D1925) | 4.11 | 4.54 | 4.28 | 3.61 |

EXAMPLE 2

Effect of Various Peroxide Compositions on the Color (Yellowness) of Crosslinked Ultrapure Polyethylene Cable Insulation Having achieved a clean crosslinked polyethylene end product as discussed in Example 1, one must also consider the cable manufacturing step. When manufacturing crosslinked high voltage cable it is important to maintain the desired level of crosslinking, while producing a uniform, smooth insulation layer of thickness. In order to achieve this, it is essential that no unnecessary crosslinking occur during the manufacturing step. A rheometer is commonly used to determine satisfactory processability in the cable industry. In Table 2, we unexpectedly discovered that at a common processing temperature of 135° C., the present invention's peroxide composition #4 provided a dramatic 50% increase in scorch time performance ($T_{SO\ 4}$=32.19 minutes) versus only 21.43 minutes for the dicumyl peroxide (composition #1). The performance of the hydroquinone monomethyl ether is far superior to the other prior art quinones (compositions #2 & #3).

It is also very important to maintain an equivalent level of crosslinking compared to the conventional peroxide. Note that at cure temperatures of 175° C., composition #4 provides the same amount of crosslinking ($M_H$–$M_L$) attained by the control (composition #1) of 5.85 inch-pounds.

Furthermore from a productivity standpoint it is important that any increase in scorch time, does not contribute to a change or increase in the overall cure time. Composition #4 provides $T_{C90}$ at 175° C. (time to attain 90% of the cure) of 6.53 minutes versus 6.57 for composition #1, which is quite advantageous, given the 50% increase in scorch time at 135° C.

TABLE 2

| Peroxide Composition # | 1 | 2 | 3 | 4 |
|---|---|---|---|---|
| The Crosslinking Performance of Various Peroxide Compositions when Crosslinking Ultrapure Cable Grade Polyethylene ||||| 
| Cable grade dicumyl peroxide (%) | 100.0 | 89.0 | 89.0 | 89.0 |
| Triallyl cyanurate (%) | — | 7.5 | 7.5 | 8.3 |
| Hydroquinone monomethyl ether (%) | — | 2.0 | 2.0 | 2.7 |
| Mono-t-butyl hydroquinone (%) | — | 1.5 | — | — |
| Di-t-amyl hydroquinone (%) | — | — | 1.5 | — |
| Crosslinking an ultrapure polyethylene cable insulation with the various peroxide compositions provided above ||||| 
| Cable grade polyethylene (grams) | 100.00 | 100.00 | 100.00 | 100.00 |
| Peroxide composition #1 (grams) | 1.79 | — | — | — |
| Peroxide composition #2 (grams) | — | 1.82 | — | — |
| Peroxide composition #3 (grams) | — | — | 1.84 | — |
| Peroxide composition #4 (grams) | — | — | — | 1.79 |

TABLE 2-continued

| Peroxide Composition # | 1 | 2 | 3 | 4 |
|---|---|---|---|---|
| Crosslinking Data using a Moving Die Rheometer at 175° C. at 1° arc | | | | |
| $M_H$ (inch-pounds) | 6.48 | 6.48 | 6.69 | 6.45 |
| $M_L$ (inch-pounds) | 0.63 | 0.61 | 0.61 | 0.60 |
| $M_H$–$M_L$ (inch-pounds) | 5.85 | 5.87 | 6.08 | 5.85 |
| $T_{S1}$ (minutes) | 1.34 | 1.54 | 1.46 | 1.50 |
| $T_{C90}$ (minutes) | 6.57 | 6.65 | 6.44 | 6.53 |
| Scorch Time Data using a Movie Die Rheometer at 135° C. at 1° arc | | | | |
| $T_{SO\,4}$ | 21.43 | 29.60 | 30.38 | 32.19 |

The subject matter which applicants regard as their invention is particularly pointed out and distinctly claimed as follows:

We claim:

1. A sulfur free crosslinking, scorch retarding mixture for crosslinking polymers capable of being crosslinked by free radical initiators and providing reduced scorch during compounding consisting essentially of:
    a). at least one free radical initiator suitable for crosslinking polymers selected from the group consisting of organic peroxides and azo initiators;
    b). at least one hydroquinone mono alkyl or mono aryl ether; and
    c). at least one crosslinkage promoter.

2. A crosslinking, scorch retarding mixture as defined in claim 1 wherein the hydroquinone mono alkyl ether is hydroquinone monomethyl ether.

3. A crosslinking, scorch retarding mixture as defined in claim 1 consisting essentially of
    a). 2,5-dimethyl-2,5-di(t-butylperoxy) hexane;
    b). di(t-butyl peroxy) diisopropyl benzene;
    c). triallyl isocyanurate;
    d). hydroquinone monomethyl ether; and
    e). mono-t-butyl hydroquinone.

4. A crosslinking, scorch retarding mixture as defined in claim 1 consisting essentially of
    a). di(t-butyl peroxy) diisopropyl benzene;
    b). triallyl isocyanurate; and
    c). hydroquinone monomethyl ether.

5. A crosslinking, scorch retarding mixture as defined in claim 1 wherein the organic peroxides are selected from the group consisting of
    a). dicumyl peroxide;
    b). dicumyl peroxide and isopropylcumyl cumyl peroxide; and
    c). t-butyl cumyl peroxide.

* * * * *